United States Patent
Taki et al.

(10) Patent No.: US 9,858,018 B2
(45) Date of Patent: Jan. 2, 2018

(54) IMAGE FORMING SYSTEM AND IMAGE FORMING APPARATUS

(71) Applicant: Konica Minolta, Inc., Tokyo (JP)

(72) Inventors: Kenji Taki, Fuchu (JP); Hiroyuki Arai, Hachioji (JP); Fusako Ozawa, Hachioji (JP); Syunji Shimokawa, Inagi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/049,703

(22) Filed: Feb. 22, 2016

(65) Prior Publication Data

US 2016/0246550 A1    Aug. 25, 2016

(30) Foreign Application Priority Data

Feb. 24, 2015 (JP) ................. 2015-034009

(51) Int. Cl.
| | |
|---|---|
| *H04N 1/04* | (2006.01) |
| *G06F 3/12* | (2006.01) |
| *B41J 3/00* | (2006.01) |
| *G06K 15/00* | (2006.01) |
| *G06K 15/02* | (2006.01) |

(52) U.S. Cl.
CPC ............ *G06F 3/1217* (2013.01); *B41J 3/00* (2013.01); *G06F 3/1204* (2013.01); *G06F 3/1206* (2013.01); *G06F 3/1261* (2013.01); *G06F 3/1282* (2013.01); *G06F 3/1296* (2013.01); *G06K 15/00* (2013.01); *G06K 15/005* (2013.01); *G06K 15/021* (2013.01); *G06K 15/4025* (2013.01); *G06K 2215/0082* (2013.01)

(58) Field of Classification Search
CPC .... G06F 3/1217; G06F 3/1204; G06F 3/1206; G06F 3/1261; G06F 3/1282
USPC ....................... 358/1.12, 1.9, 1.15
See application file for complete search history.

(56) References Cited

U.S. PATENT DOCUMENTS 6,483,601 B1 *  11/2002  Yoneyama ............ G06K 15/00
                                                          358/1.13
2002/0015599 A1 *  2/2002  Takuwa ............ G03G 15/5012
                                                          399/82

FOREIGN PATENT DOCUMENTS

JP             2013-020490 A    1/2013

* cited by examiner

*Primary Examiner* — Houshang Safaipour
(74) *Attorney, Agent, or Firm* — Baker & Hostetler LLP

(57) ABSTRACT

An image forming system capable of executing a print job including a first job and a second job, the image forming system includes: an image forming apparatus configured to print an image on a sheet based on the first job, and thereafter, print an image on a sheet based on the second job; a sheet conveyance apparatus configured to insert the sheet that has been printed by the first job into the sheet that has been printed by the second job; an input unit configured to be used to input a time period in which execution of user operation related to the sheet conveyance apparatus is possible; and a control unit configured to print the job so as to finish the first job within the time period that has been input by the input unit.

10 Claims, 15 Drawing Sheets

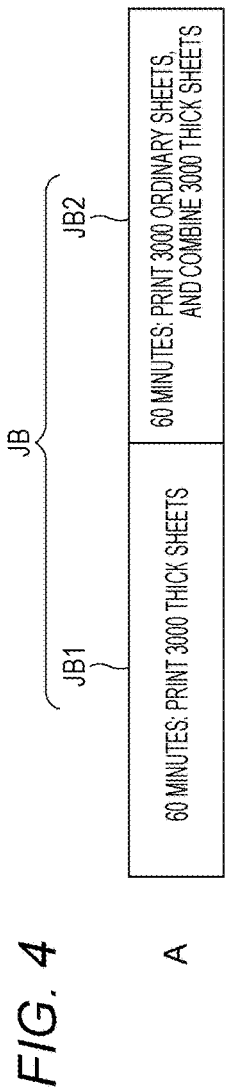
FIG. 4  A
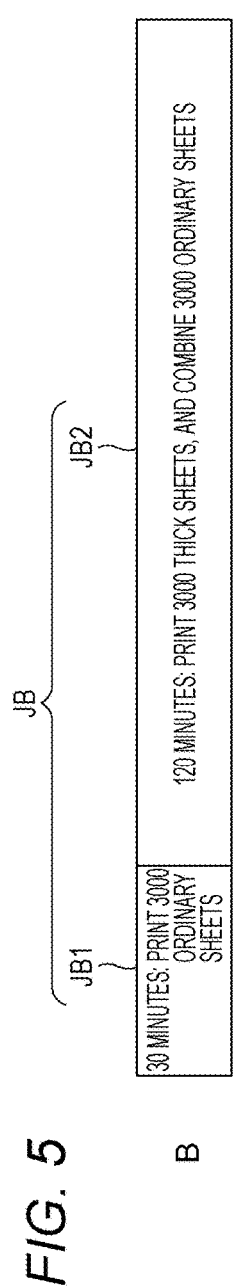
FIG. 5  B
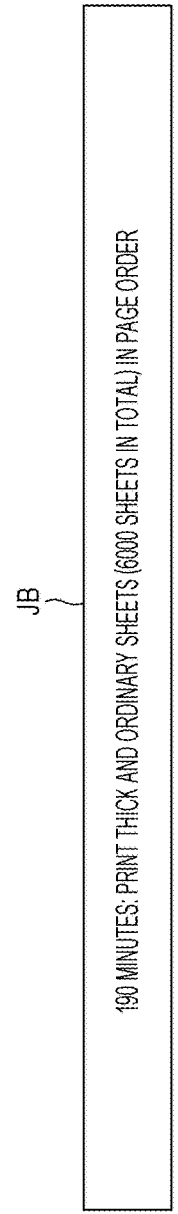
FIG. 6  C

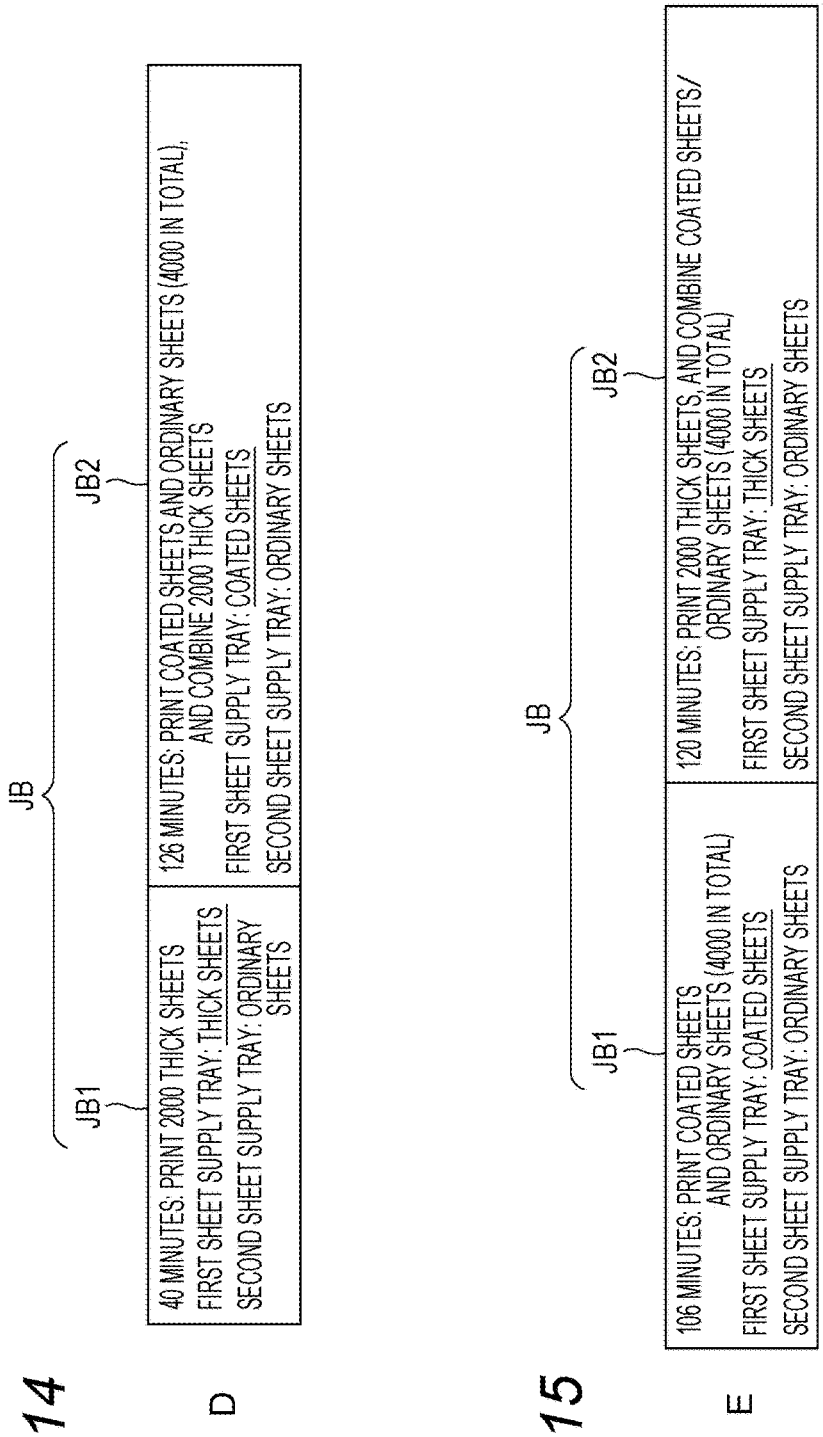

IMAGE FORMING SYSTEM AND IMAGE FORMING APPARATUS

The present U.S. application claims priority to Japanese Patent Application No. 2015-034009, which was filed on Feb. 24, 2015. The entire disclosure of Japanese Patent Application No. 2015-034009, including description, claims, drawings, and abstract, is incorporated herein by reference in its entirety.

BACKGROUND OF THE INVENTION

Field of the Invention

The present invention relates to an image forming system and an image forming apparatus.

Description of the Related Arts

In commercial printing in recent years, there are many cases where a job using a plurality of sheet types is executed. Examples of such a job include creation of a booklet by combining a thick sheet into ordinary sheets. For this purpose, an image forming system is provided with multi-stage sheet supply trays and is configured to be able to place sheets with a plurality of sheet types onto separate sheet supply trays beforehand. With this configuration, even when the sheet types have been switched, it is possible to continue execution of printing operation without stopping the printing operation just by switching the sheet supply trays, enabling efficient execution of print jobs.

In the above-described image forming system, however, in a case where a sheet shortage, or the like, occurs during execution of a print job of printing sheets of a plurality of sheet types, printing operation has to be stopped until user operation such as sheet refilling is finished. This would consequently cause deterioration of system productivity. Moreover, in execution of the print job of printing sheets of the plurality of sheet types, determining optimum operation for replacing a sheet in a tray is not easy. This also causes deterioration of productivity of the system.

To cope with this, techniques are proposed for replacing the sheet in the tray efficiently in order to avoid deterioration of productivity of the system. JP 2013-20490 A, for example, discloses an imaging forming system used in an image forming apparatus including a plurality of trays. Specifically, the image forming system, when executing a plurality of print jobs using one or a plurality of types of sheets, determines an optimum tray usage schedule based on an evaluation value onto which the number of times of sheet replacement has been reflected from a plurality of combinations of the trays and the sheet types. According to the image forming system described in JP 2013-20490 A, the number of times of sheet replacement during a print job can be reduced.

Unfortunately, the image forming system described in JP 2013-20490 A has a following disadvantage. That is, there may be, during execution of a print job, a case of occurrence of a time zone in which a user/operator is absent due to other operation, or the like, and the user, or the like, is not available for executing operation related to the image forming system. When execution of a print job using a plurality of sheet types brings about overlapping of timing of user operation such as sheet refilling to an inserter, with the user/operator unavailable timing, printing operation might stop and lead to deterioration of system productivity.

SUMMARY OF THE INVENTION

The present invention has been made in view of the above-described problem, and an object thereof is to provide an image forming system and an image forming apparatus capable of preventing deterioration of system productivity regardless of occurrence of user unavailable time during execution of a print job.

To achieve the abovementioned object, according to an aspect, an image forming system capable of executing a print job including a first job and a second job, reflecting one aspect of the present invention, comprises: an image forming apparatus configured to print an image on a sheet based on the first job, and thereafter, print an image on a sheet based on the second job; a sheet conveyance apparatus configured to insert the sheet printed by the first job into the sheet printed by the second job; an input unit configured to be used to input a time period in which execution of user operation related to the sheet conveyance apparatus is possible; and a control unit configured to execute printing of the job so as to finish the first job within the time period that has been input by the input unit.

To achieve the abovementioned object, according to an aspect, an image forming apparatus capable of executing a print job including a first job and a second job, reflecting one aspect of the present invention, comprises: an image forming unit configured to print an image on a sheet based on the first job, and thereafter, print an image on a sheet based on the second job; an insertion unit configured to insert the sheet printed by the first job into the sheet printed by the second job; an input unit configured to be used to input a time period in which execution of user operation related to the insertion unit is possible; and a control unit configured to execute printing of the job so as to finish the first job within the time period that has been input by the input unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is a diagram illustrating a print pattern A in the print job;

FIG. 5 is a diagram illustrating a print pattern B in the print job;

FIG. 6 is a diagram illustrating a print pattern C in the print job;

FIG. 14 is a diagram illustrating a print pattern D in the print job;

FIG. 15 is a diagram illustrating a print pattern E in the print job;

DESCRIPTION OF THE PREFERRED EMBODIMENTS

Figure 1:
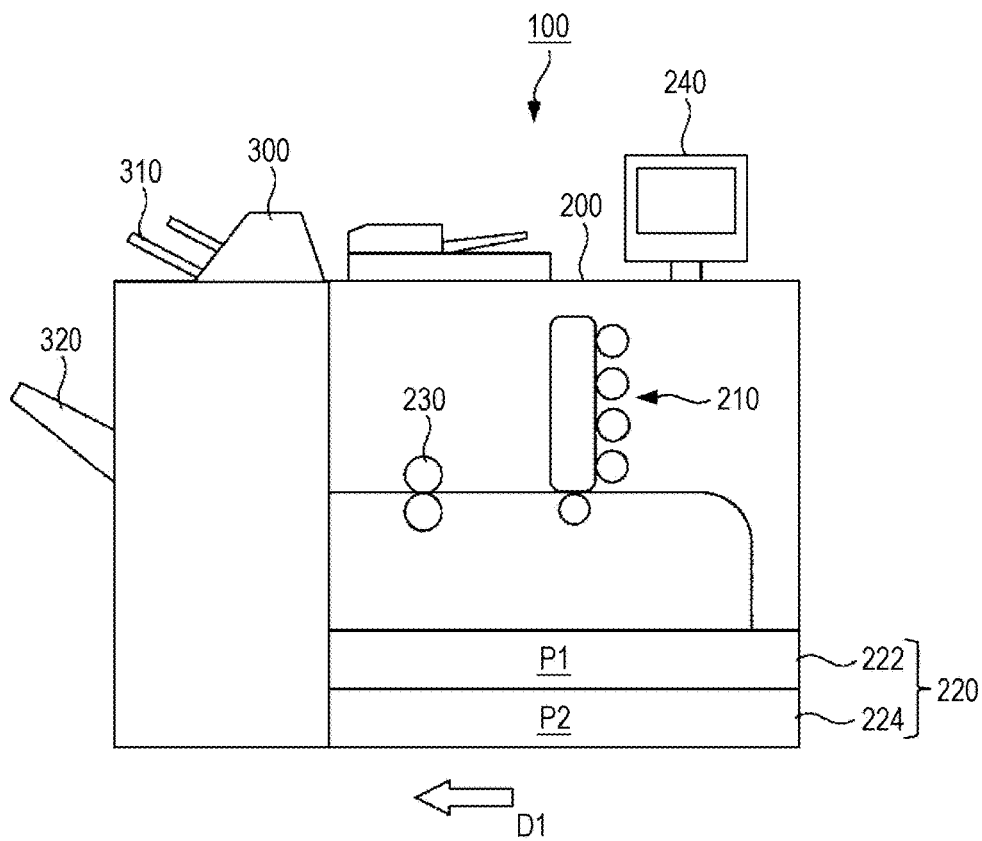
FIG. 1 is a diagram illustrating an exemplary configuration of an image forming system according to a first embodiment of the present invention.

Hereinafter, preferred embodiments of the present invention will be described in detail with reference to the drawings. However, the scope of the invention is not limited to the illustrated examples. Note that, for the purposes of explanation, proportions of dimensions in the drawings may be expanded, in some cases, and may differ from the proportions in reality.

<First Embodiment>
[Exemplary Configuration of Image Forming System 100]

FIG. 1 illustrates an exemplary configuration of an image forming system 100 according to an embodiment of the present invention. As illustrated in FIG. 1, the image forming system 100 includes an image forming apparatus 200 and a post inserter 300. The image forming apparatus 200 is an apparatus utilizing, for example, an electrophotographic imaging process and includes an operation display unit 240, an image forming unit 210, a sheet supply unit 220, and a fixing unit 230.

The operation display unit 240 includes a touch panel and a plurality of operation keys. The touch panel combines a display apparatus including a liquid crystal panel, and a position input apparatus. The operation keys includes a number key and an enter key. The operation display unit 240 displays a screen to be used for obtaining a user operation available time zone, a screen to indicate a state of the sheet supply tray, or the like. In addition, the operation display unit 240 receives user operation available time zone information and image forming conditions such as a sheet type and grammage that have been input by these screens and the operation keys. The operation display unit 240 forms an example of the input unit.

The sheet supply unit 220 includes a first sheet supply tray 222 and a second sheet supply tray 224. Each of the first sheet supply tray 222 and the second sheet supply tray 224 houses sheets with various sheet types and sizes. In the present example, a sheet such as an ordinary sheet P1, and a thick sheet P2 with grammage and surface property being different from the P1. The sheet supply unit 220 picks up one sheet at a time from the first sheet supply tray 222 and from the second sheet supply tray 224, and conveys the sheets to the image forming unit 210. Alternatively, it is possible to connect a large-capacity sheet supply apparatus upstream of the image forming apparatus 200 in a sheet conveyance direction D1 and to supply sheets from this large-capacity sheet supply apparatus.

The image forming unit 210 includes a charging unit, an exposure unit, a developing unit, a cleaning unit, a photosensitive drum (not illustrated) corresponding to four colors of Y(yellow), M(magenta), C(cyan), and K(black). The image forming unit 210 forms a predetermined image on a sheet based on a print job transmitted from a computer (not illustrated) or based on image data created by an image reading unit of a main body of the apparatus.

The fixing unit 230 includes a fixing roller, a press roller, a heat roller, and a belt. The image formed by the image forming unit 210 on the sheet undergoes heating and pressurizing processing by the fixing unit 230, and thus the image is fixed onto the sheet. The fixing-processed sheet is conveyed to the post inserter 300 at a subsequent stage.

The post inserter 300 is connected downstream of the image forming apparatus 200 in the sheet conveyance direction D1, and includes a sheet supply tray 310 and a sheet eject tray 320. The post inserter 300 inserts (combines) a sheet placed on the sheet supply tray 310 into the sheet with a different sheet type conveyed from the image forming apparatus 200 such that a page order is correctly arranged. A sheet on which an image is formed by the image forming apparatus 200 and a combined sheet are ejected to the sheet eject tray 320.

Herein, the image forming apparatus 200 is configured to form a color image. The apparatus may be, however, configured to form a monochromatic image. Alternatively, the post inserter 300 may be configured with a large-capacity sheet supply apparatus having multi-stage sheet supply trays. Furthermore, it is possible to connect a large-capacity stacker apparatus downstream of the post inserter 300 in the sheet conveyance direction D1 and to allow the sheet on which an image is formed and a combined sheet to be ejected to the large-capacity stacker apparatus.

Figure 2:
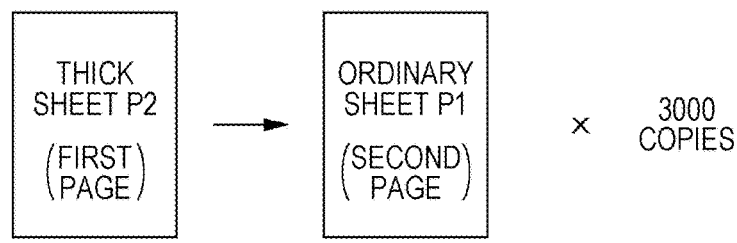
FIG. 2 is a diagram illustrating an exemplary configuration of a print job.

Subsequently, exemplary operation on the above-described image forming system. 100 in a case where a print job JB of creating a sheet bundle that combines an ordinary sheet P1 and a thick sheet P2 is executed will be described. FIG. 2 illustrates an exemplary configuration of the print job JB. As illustrated in FIG. 2, in the print job JB, the thick sheet P2 is printed as a first page and the ordinary sheet P1 is printed as a second page. A print job of inserting (combining) the thick sheet P2 into the ordinary sheet P1 is executed so as to create 3000 copies of sheet bundles (booklets). On the image forming apparatus 200, the ordinary sheets P1 are placed on the first sheet supply tray 222, and the thick sheets P2 are placed on the second sheet supply tray 224.

The image forming apparatus 200, in response to a print command received from a computer (not illustrated), picks up each of the thick sheets P2 sequentially from the second sheet supply tray 224 so as to form an image. After the image has been formed on each of the thick sheets P2, the thick sheets P2 are ejected to the sheet eject tray 320 of the post inserter 300. When printing of a predetermined number of sheets has been finished, a user picks up a sheet bundle of the thick sheets P2 from the sheet eject tray 320 and places the sheet bundle onto the sheet supply tray 310 of the post inserter 300. Note that sheet refill operation as described above corresponds to user operation related to the sheet conveyance apparatus.

Next, the image forming apparatus 200 picks up each of the ordinary sheets P1 from the first sheet supply tray 222 so as to form an image on the sheet. After the image has been formed on each of the ordinary sheets P1, the ordinary sheets P1 are conveyed to the post inserter 300. At this time, the post inserter 300 feeds the thick sheet P2 from the sheet supply tray 310 and inserts (combines) the thick sheet P2 into the conveyed ordinary sheet P1 such that a page order is correctly arranged. The thick sheet P2 and the ordinary sheet P1 are combined such that the page order is correctly arranged, and then, ejected to the sheet eject tray 320. In this manner, the sheet bundle based on the print job JB illustrated in FIG. 2 can be created.

The reason for printing the thick sheets P2 collectively prior to the ordinary sheets P1, in this context, will be described. The ordinary sheet P1 and the thick sheet P2 have their own suitable fixing temperatures. Switching fixing temperatures between the temperature suitable for the thick sheet P2 and the temperature suitable for the ordinary sheet P1 requires a predetermined temperature switching time for each direction of switching. Accordingly, printing the thick sheets P2 and the ordinary sheets P1, as a whole, sequentially in the page order would deteriorate productivity for a total time of temperature switching.

[Sheet Interval Time]

FIGS. 3A to 3D illustrate examples of sheet interval time (hereinafter, also referred to as "sheet interval") between each of sheet types. Hereinafter, machine productivity of the ordinary sheet P1 is defined as 100 ppm (page per minute), and the machine productivity of the thick sheet P2 is defined as 50 ppm. Herein, the sheet interval is defined as time taken from a moment in which an edge of a first sheet reaches a sheet eject outlet of the image forming apparatus 200 to a moment in which an edge of a second sheet reaches the sheet eject outlet of the image forming apparatus 200.

Figure 3A:
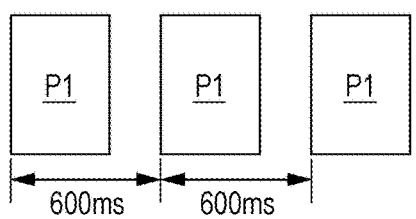
FIGS. 3A to 3D are diagrams illustrating sheet interval time for each of sheet types.
Figure 3B:
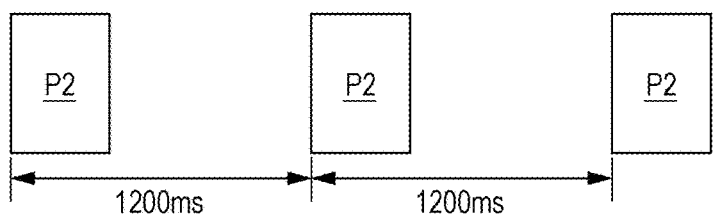
Figure 3C:
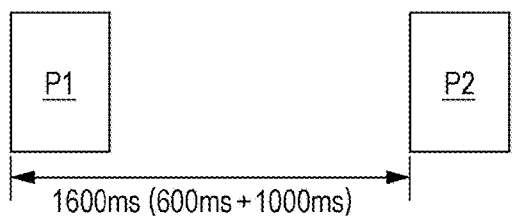
Figure 3D:
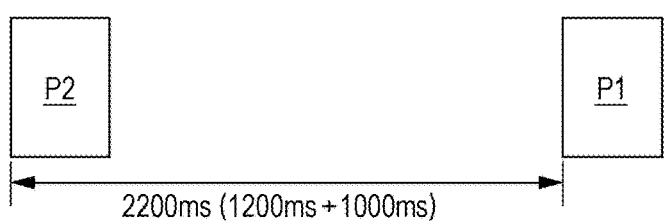

FIG. 3A illustrates a case where the ordinary sheet P1 is printed consecutively. In this case, the sheet interval would be 600 ms. FIG. 3B illustrates a case where the thick sheet P2 is printed consecutively. In this case, the sheet interval would be 1200 ms. FIG. 3C illustrates a case where the ordinary sheet P1 is first printed and thereafter the thick sheet P2 is printed. In this case, the sheet interval would be 1600 ms, which is a sum of the sheet interval 600 ms of the ordinary sheet P1 and 1000 ms that is the time needed to switch the fixing temperatures. FIG. 3D illustrates a case where the thick sheet P2 is first printed and thereafter the ordinary sheet P1 is printed. In this case, the sheet interval would be 2200 ms, which is a sum of the sheet interval 1200 ms of the thick sheet P2 and 1000 ms that is the time needed to switch the fixing temperatures.

[Examples of Print Pattern Types]

FIGS. 4 to 6 illustrate examples of print pattern types of the print job JB illustrated in FIG. 2. As illustrated in FIGS. 4 to 6, the print job JB has a total of three types of print patterns A to C as combinations of print patterns. The time needed to output each of the print patterns A to C is determined based on the sheet interval of each of the ordinary sheet P1 and the thick sheet P2, and on the time needed to switch the fixing temperatures.

As illustrated in FIG. 4, the print pattern A includes two divided jobs, namely, a job JB1 (a first job) and a job JB2 (a second job). The job JB1 prints images on 3000 thick sheets P2. The job JB2 first prints images on 3000 ordinary sheets P1, and then, inserts (combines) 3000 thick sheets P2 into the ordinary sheets P1. The time needed to output the job JB1 would be 60 minutes that corresponds to 60 minutes needed to print the images on the thick sheets P2. The time needed to output the job JB2 would be a total of 60 minutes, which is a sum of 30 minutes needed to print the images on the ordinary sheets P1 and 30 minutes needed to combine the thick sheets P2 into the ordinary sheets P1. Accordingly, the total time needed to output the print pattern A would be 120 minutes. Herein, it is assumed that the time needed to combine the thick sheet P2 is equal to the time needed to feed the ordinary sheet P1 (sheet interval).

As illustrated in FIG. 5, the print pattern B includes two divided jobs, namely, a job JB1 (a first job) and a job JB2 (a second job). The job JB1 prints images on 3000 ordinary sheets P1. The job JB2 first prints images on 3000 thick sheets P2, and then, combines 3000 ordinary sheets P1 into the thick sheets P2. The time needed to output the job JB1 would be 30 minutes that corresponds to 30 minutes needed to print the images on the ordinary sheets P1. The time needed to output the job JB2 would be a total of 120 minutes, which is a sum of 60 minutes needed to print the images on the thick sheets P2 and 60 minutes needed to combine the ordinary sheets P1 into the thick sheets P2. Accordingly, the total time needed to output the print pattern B would be 150 minutes.

As illustrated in FIG. 6, the print pattern C includes a job of executing processing in which a total of 6000 pages (3000 pages for each of the sheet types) of images are printed on the ordinary sheets P1 and the thick sheets P2 sequentially in the page order. In other words, the print pattern C is a job that does not involve user operation. The total time needed to output the print pattern C would be 190 minutes, which is a sum of 30 minutes needed to print images on the ordinary sheets P1, 60 minutes needed to print images on the thick sheets P2, and 100 minutes needed to switch the fixing temperatures 6000 times.

[Exemplary Functional Configuration of Image Forming System 100]

Figure 7:
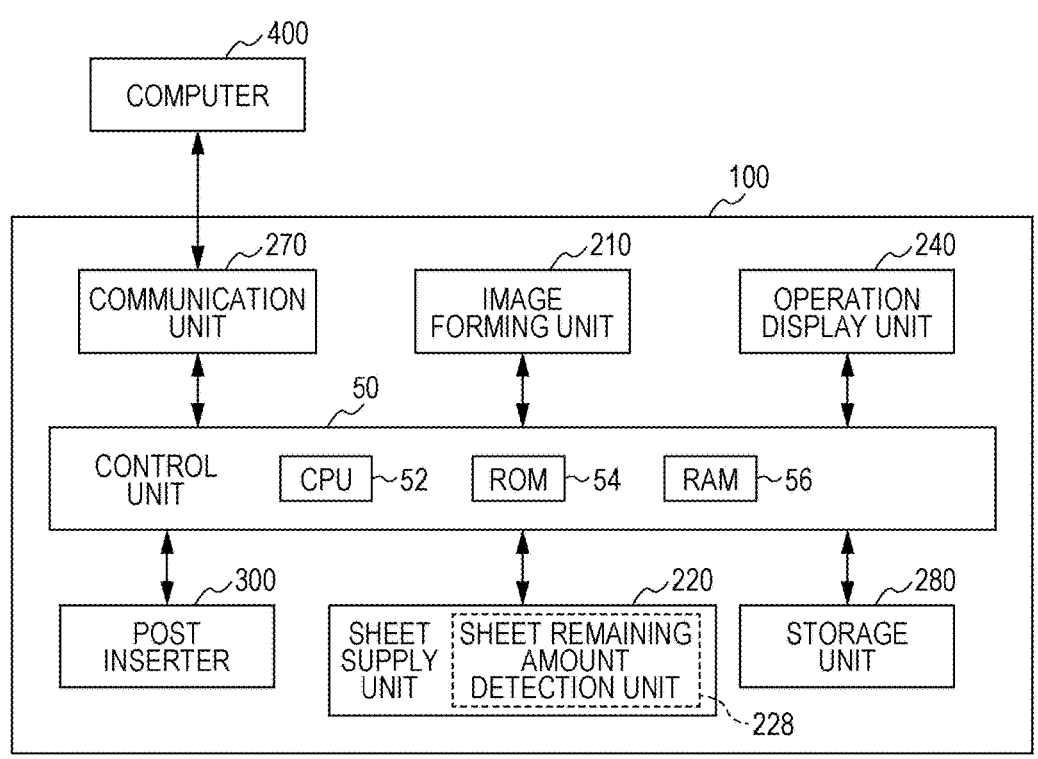
FIG. 7 is a block diagram illustrating an exemplary functional configuration of the image forming system.

FIG. 7 is a block diagram illustrating an exemplary functional configuration of the image forming system 100. As illustrated in FIG. 7, the image forming system 100 includes a control unit 50 that controls overall system operation. The control unit 50 includes a central processing unit (CPU) 52, a read only memory (ROM) 54, and a random access memory (RAM) 56. The CPU 52 reads a piece of software (a program) from the ROM 54, expands it onto the RAM 56 to execute it, thereby controlling each of components of the image forming system 100. In addition, the CPU 52 implements processing to select an optimum print pattern based on information on user availability (operation available time zone information) to be set.

The control unit 50 that executes main control can be provided on the image forming apparatus 200, or on the post inserter 300. It is also possible to configure such that each of the image forming apparatus 200 and the post inserter 300 has its own control unit and that control is executed by these control units working in cooperation.

The control unit 50 is connected with each of the image forming unit 210, the sheet supply unit 220, the operation display unit 240, a storage unit 280, the post inserter 300, and a communication unit 270. The image forming unit 210 executes image forming processing based on the control of the control unit 50. The sheet supply unit 220, based on the control of the control unit 50, picks up a sheet from the first sheet supply tray 222, or the like, and conveys the sheet. The operation display unit 240 executes display controls based on the control of the control unit 50, and supplies information received from the operation screen, or the like, to the control unit 50.

The storage unit 280 includes a nonvolatile memory and a hard disk drive (HDD). The storage unit 280 stores, for example, image forming conditions (setting information related to image forming) including image data, sheet type, and grammage, based on the print job JB.

The post inserter 300, based on the instruction from the control unit 50, feeds the sheets refilled onto the sheet supply tray 310, one by one, to the conveyance path. The post inserter 300, then, inserts the sheet into the sheets conveyed from the image forming apparatus 200 such that the sheets are arranged in the page order, and stacks the combined sheets on the sheet eject tray 320.

The control unit 50 is connected to a personal computer (hereinafter, referred to as a computer) 400 via a network such as a LAN. The computer 400 includes an operation unit, a display unit, and a calculation unit, and transmits a print job JB input based on user operation to the communication unit 270 of the image forming system 100. The communication unit 270 includes a communication interface and executes two-way communication of data related to image forming between the control unit 50 and the computer 400.

[User Availability Setting Screen Display Example (1)]

Figure 8:
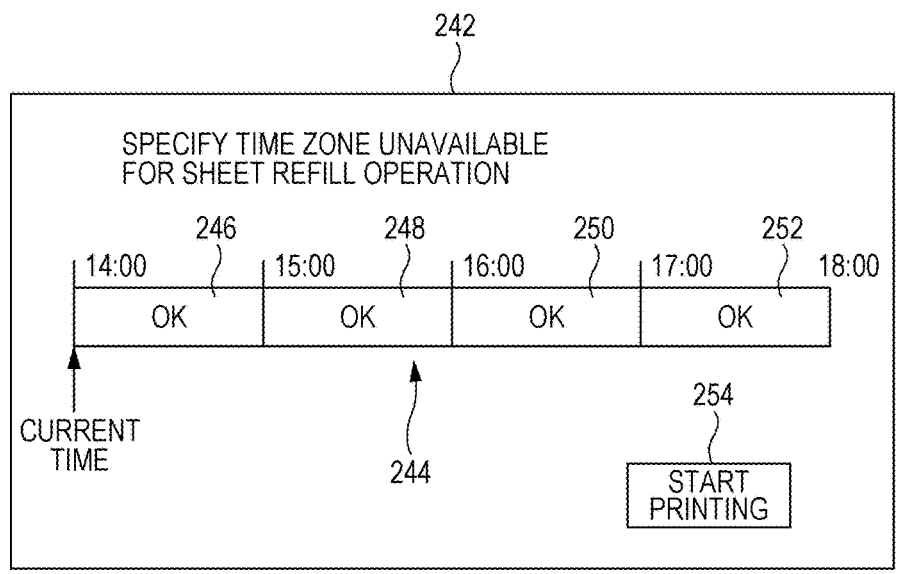
FIG. 8 is a diagram illustrating an exemplary display of a user availability setting screen.

FIG. 8 is an exemplary configuration of a user availability setting screen 242 to be displayed on the operation display unit 240 before the print job JB is started. Note that in FIGS. 8 to 11, the current time is assumed to be 14:00. As illustrated in FIG. 8, on the user availability setting screen 242, characters read as "specify time zone unavailable for sheet refill operation" are displayed. Further, on this screen, a time zone selection buttons 244 for selecting the time zone in which the user is not available for executing operation, and a print start button 254 to start printing the print job JB.

The time zone selection buttons 244 include a button 246 to select unavailability at 14:00 to 15:00, a button 248 to select unavailability at 15:00 to 16:00, a button 250 to select unavailability at 16:00 to 17:00, and a button 252 to select unavailability at 17:00 to 18:00. Each of the buttons 246, 248, 250, and 252 has a rectangular shape and is displayed to be sequentially aligned with respect to each other in a horizontal direction on the user availability setting screen 242. As default, each of the buttons 246, 248, 250, and 252 displays OK to indicate the user is available in the corresponding time zone. When the user presses (selects) any of the buttons 246, 248, 250, and 252, the display of the pressed button changes from OK to NG (refer to FIG. 9). When none of the buttons 246, 248, 250, and 252 is pressed, it is determined that the execution of user operation is possible in all of the time zones. Alternatively, it is possible to configure such that the characters of NG are displayed as default and that the display is changed to OK in response to a timing when the corresponding buttons of the buttons 246, 248, 250, and 252 is pressed.

[User Availability Setting Screen Display Example (2)]

Figure 9:
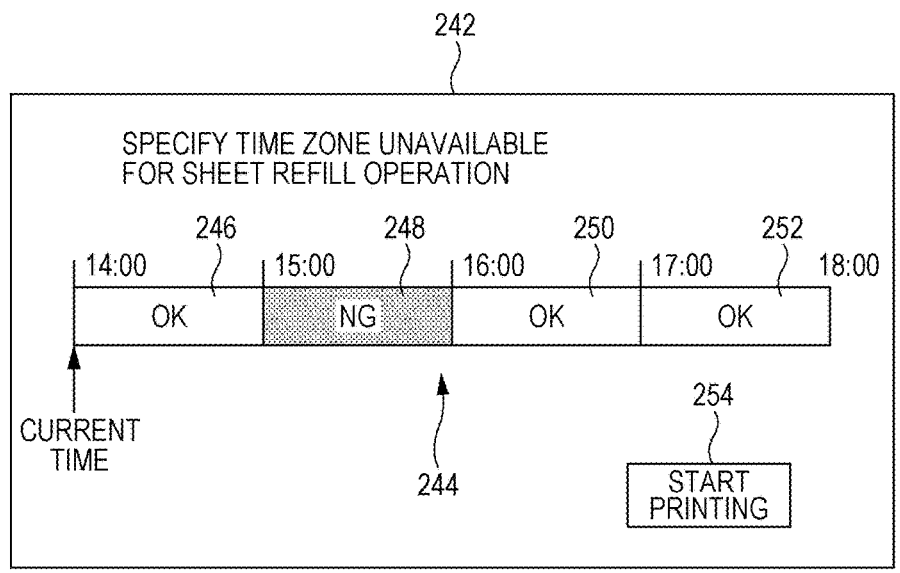
FIG. 9 is a diagram illustrating an exemplary display of the user availability setting screen.

FIG. 9 is an exemplary display of the user availability setting screen 242 when a user has selected an unavailable time zone. For example, when the user is not available for executing operation during 15:00 to 16:00, the button 248 is selected on the user availability setting screen 242. When the button 248 is selected, the color of the button 248 is highlighted, as illustrated in FIG. 9, while the display of the button 248 is changed from OK to NG. With this configuration, the control unit 50 can obtain not only information on a user unavailable time zone but also information on a user available time zone other than the unavailable time zone.

In the case illustrated in FIG. 9, during execution of the print pattern A, the user is unavailable at 15:00 on which the printing of the previous job JB1 is finished. This means printing of the print job JB is stopped in the middle of operation. To avoid this, the control unit 50 selects the print pattern B. With the print pattern B, printing of the job JB1 is not finished during 15:00 to 16:00, that is, printing of the job JB1 is finished during the time period before 15:00, namely, the period in which user is available for operation. According to the print pattern B, the print finish time of the job JB1 would be 14:30. This means the finish time of the job JB1 does not overlap with the user unavailable time, making it possible to execute the print job JB without stopping it.

[User Availability Setting Screen Display Example (3)]

Figure 10:
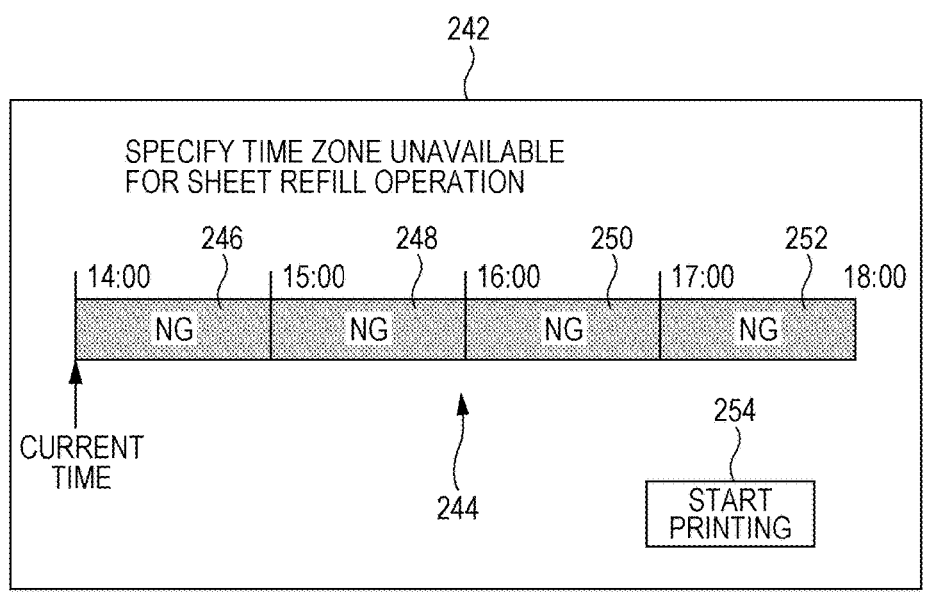
FIG. 10 is a diagram illustrating an exemplary display of the user availability setting screen.

FIG. 10 is another exemplary display of the user availability setting screen 242 when the user has selected an unavailable time zone. When the user is not available for executing operation during 14:00 to 18:00, the buttons 246, 248, 250, and 252 are selected on the user availability setting screen 242. When the buttons 246, 248, 250, and 252 are selected, the buttons 246, 248, 250, and 252 are highlighted, as illustrated in FIG. 10, while the displays of the buttons 246, 248, 250, and 252 are changed from OK to NG.

In the case illustrated in FIG. 9, during execution of the print pattern A, the user is unavailable at 15:00, on which the printing of the previous job JB1 is finished. This means printing of the print job JB is stopped in the middle of operation. To avoid this, the control unit 50 selects, for example, the print pattern C. With the print pattern C, printing of the job JB1 is not finished during 14:00 to 18:00. By selecting the print pattern C, no user operation such as sheet refilling to the sheet supply tray 310 of the post inserter 300 would be generated, making it possible to execute printing of the print job JB without stopping it.

[User Availability Setting Screen Display Example (4)]

Figure 11:
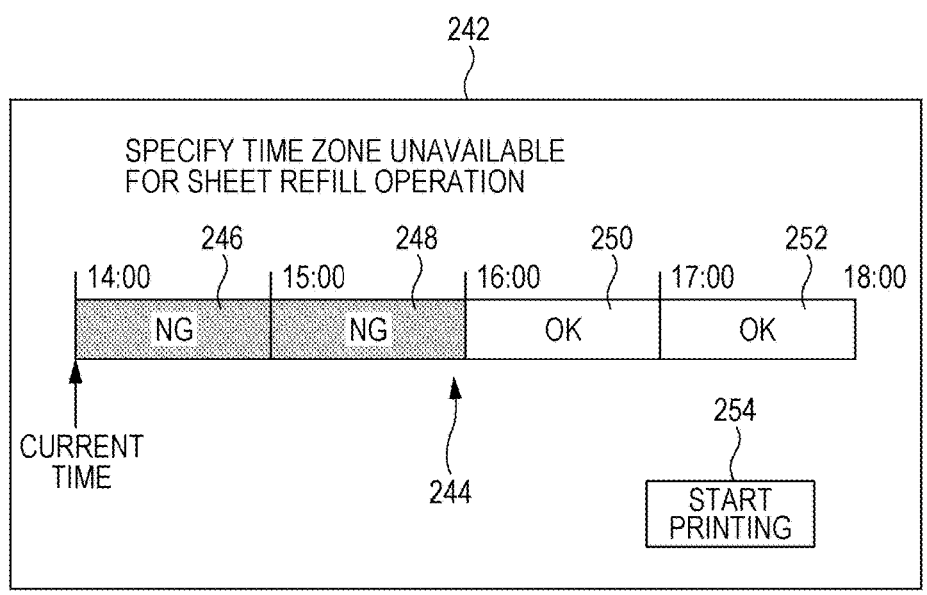
FIG. 11 is a diagram illustrating an exemplary display of the user availability setting screen.

FIG. 11 is another display example of the user availability setting screen 242 when the user has selected an unavailable time zone. When the user is not available for executing operation during 14:00 to 16:00, the buttons 246 and 248 are selected on the user availability setting screen 242. When the buttons 246 and 248 are selected, the colors of the buttons 246 and 248 are highlighted, as illustrated in FIG. 11, while the displays of the buttons 246 and 248 are changed from OK to NG. With this configuration, the control unit 50 can obtain not only information on a user unavailable time zone but also information on a user available time zone other than the unavailable time zone.

In this case, when any of the print patterns A and B is selected, user operation time for sheet refilling, or the like and an operation unavailable time zone would overlap with each other. Accordingly, the print pattern C for which no user operation is required may be specified as a candidate of the print pattern. On the other hand, by comparing job finish times between the print patterns A and C, in a case where sheets are refilled at 16:00, on which the user is available for operation, in the print pattern A, the job finish time would be 17:00. By contrast, in the print pattern C, the job finish time would be 17:10 although no sheet refill operation would be generated. According to this comparison, it is understandable that, when the print pattern A is selected, there is an advantage to achieve shorter printing time, but there is a disadvantage that the image forming system 100 is not available during the time period of 15:00 to 16:00.

In order to handle this situation, in the present example, there are provided a productivity priority mode in which productivity is prioritized such as the print pattern A, and a downtime reduction mode to achieve reduction of downtime, such as the print pattern C. Furthermore, any of the two modes is configured to be selectable by operation on the operation display unit 240 or on the computer 400. The productivity priority mode is effective particularly in a case, for example, where a plurality of users uses the image forming system 100.

Meanwhile, FIGS. 8 to 11 illustrate an example in which the time zone selection buttons 244 are configured to be displayed in a unit of one hour, however, the unit is not limited to this. The time may be displayed, for example, in a unit of 30 minutes, or two hours. Moreover, a range of the time zone provided in the time zone selection buttons 244, that is to be displayed on the user availability setting screen 242, is not limited to 14:00 to 18:00, but may be shorter or longer than this range.

[Exemplary Operation of Image Forming System 100]

Figure 12:
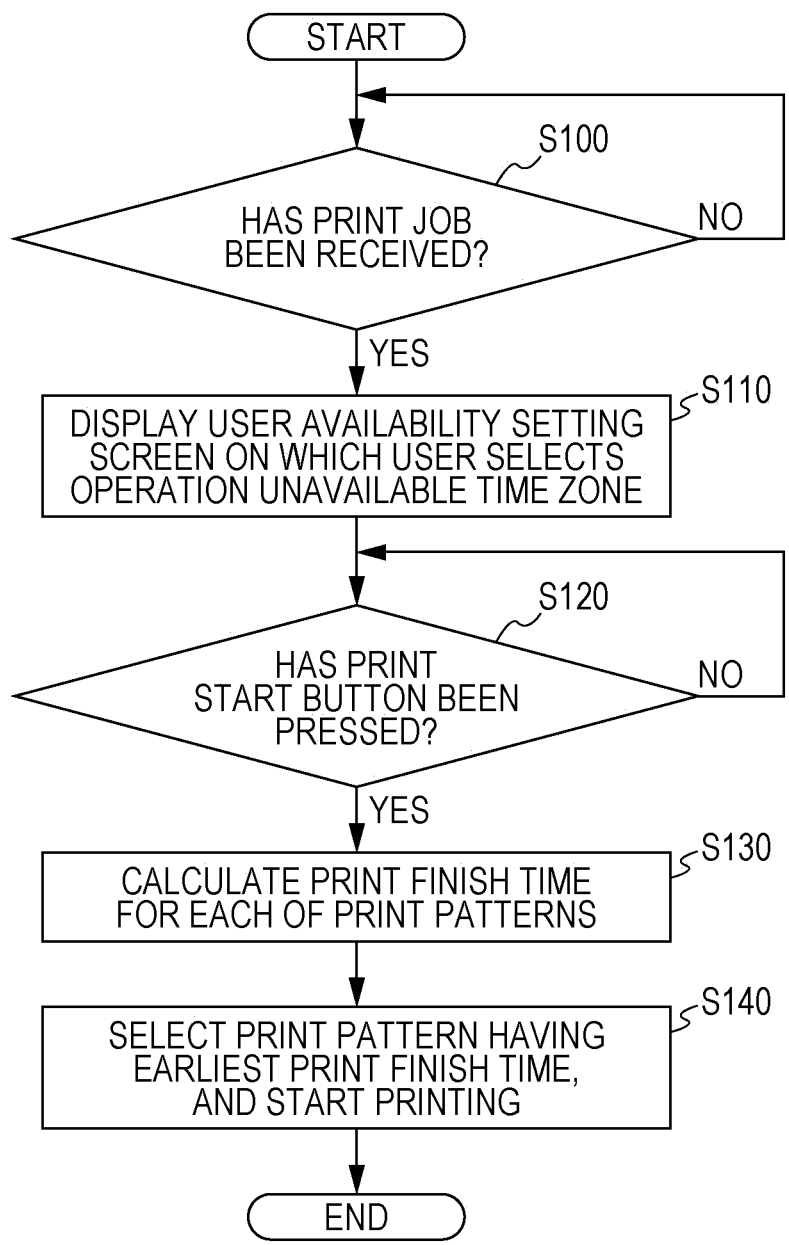
FIG. 12 is a flowchart illustrating exemplary operation of the image forming system.

FIG. 12 illustrates an exemplary operation of the image forming system 100 in a case where an optimum print pattern is selected according to the operation available time zone selected by the user. The control unit 50 reads a program from a memory such as the ROM 54 and executes it, thereby executing an operation sequence illustrated in a flowchart in FIG. 12. In the present example, execution of the print job JB illustrated in FIG. 2 will be described.

In step S100, as illustrated in FIG. 12, the control unit 50 determines whether the print job JB from the computer 400 has been received. The control unit 50, when it has determined that the print job JB has not been received, awaits until the print job JB is received. When it has determined that the print job JB has been received, processing moves on to step S110.

In step S110, after receiving the print job JB, the control unit 50 displays, on the operation display unit 240, the user availability setting screen 242 on which the user selects operation unavailable time zone. As illustrated in FIG. 9, or the like, when there is an unavailable time zone during execution time of the print job JB, the user presses a corresponding button among the buttons 246, 248, 250, and 252. The control unit 50, based on information on the button pressed by the user, obtains information on an operation unavailable time zone in which the user is not available for operation. At this time, the time zone other than the operation unavailable time zone can be determined as the time zone in which the user is available for operation, thus, it is possible to simultaneously obtain the information on the operation available time zone.

In step S120, the control unit 50 determines whether the print start button 254 has been pressed by the user on the user availability setting screen 242. The control unit 50, when it determines that the print start button 254 has not been pressed, continues checking whether the print start button 254 is pressed. In contrast, when the control unit 50 determines that the print start button 254 has been pressed, the processing moves on to step S130.

In step S130, the control unit 50 calculates print finish time in each of the print patterns. The control unit 50 calculates the print finish time in the print pattern, in consideration of user operation available time zone information (operation unavailable time zone information) that has been set on the user availability setting screen 242. For example, in the print pattern A, printing of the thick sheets P2 is finished at 15:00. When the button 248 indicating 15:00 to 16:00 on the user availability setting screen 242 has been selected, however, subsequent operation is unavailable during the time zone of 15:00 to 16:00. Accordingly, the time to execute user operation of placing the thick sheets P2 onto the sheet supply tray 310 of the post inserter 300 would be on 16:00. The control unit 50, thus, calculates the print finish time of the print pattern A as 17:00. In the print pattern B, printing of the ordinary sheets P1 is finished on 14:30. This means that the print finish time of the job JB1 overlaps with the time zone in which the user is available. Accordingly, it is possible to execute subsequent user operation as to place the ordinary sheets P1 to the sheet supply tray 310 of the post inserter 300, and to execute the job JB2. The control unit 50, thus, calculates the print finish time of the print pattern B as 16:30. The print pattern C does not involve user operation of placing the sheets onto the sheet supply tray 310 of the post inserter 300. Accordingly, the control unit 50 calculates the print finish time as 17:10.

Note that, for the sake of convenience, in the present example, the print finish time of the print job JB is calculated excluding the user operation time, which is short relative to the time needed to output the print job JB. Alternatively, of course, it is possible to include the user operation time in calculation of the print finish time of the print job JB, by calculating the user operation time with measurement in advance, or by estimating the user operation time according to the user's skill, or the like. Moreover, it is possible to display the print finish time of each of the patterns on the operation display unit 240, or the like, to be confirmed by the user.

In step S140, after finishing calculation of the print finish time of each of the print patterns, the control unit 50 starts printing by selecting the print pattern having the earliest print finish time. In a case where the user has sets the time zone 15:00 to 16:00 as the operation unavailable time zone (refer to FIG. 9), the print pattern B has the earliest print finish time. Accordingly, the control unit 50 selects the print pattern B and starts printing. Alternatively, in a case where no operation unavailable time zone has been selected on the user availability setting screen 242, namely, operation is available in all time zones, the control unit 50 selects the print pattern A that has the earliest print finish pattern.

For other cases illustrated in FIGS. 10 and 11, a similar method can be applied, namely, it is possible to calculate the print finish time for each of the print patterns A to C, and to select a print pattern that has the earliest print finish time.

According to the first embodiment, as described above, a print pattern is selected such that the user operation time involving sheet refilling onto the sheet supply tray 310 of the post inserter 300, or the like, generated after the job JB1 is finished, does not overlap with a user operation unavailable time zone that has been set by the user. In other words, the control unit 50 selects a print pattern with which printing of the preceding job JB1 is finished within the user operation available time zone, and executes printing operation with the selected print pattern. With this configuration, user operation time can be determined according to the user available time zone. Therefore, it is possible to avoid stopping of printing operation. As a result, it is possible to suppress deterioration of productivity of the image forming system 100.

<Second Embodiment>

In a second embodiment, in a case where the number of types of sheets to be printed is more than the number of sheet supply trays, a screen to prompt sheet refilling onto the sheet supply tray is configured to be displayed. Note that the other configuration and operation of the image forming system 100 are similar to the above-described first embodiment.

Therefore, for components used in common, same reference signs are attached and detailed description will be omitted.

[Exemplary Configuration of Print Job]

Figure 13:
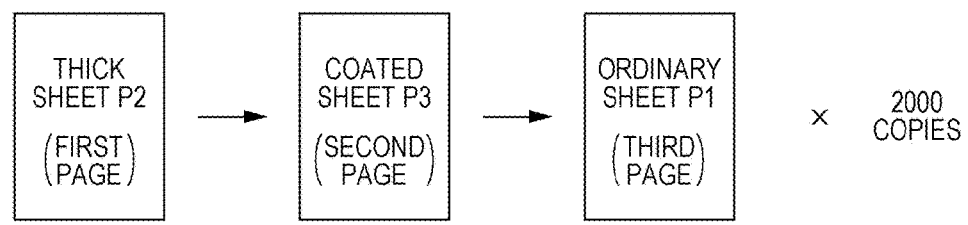
FIG. 13 is a diagram illustrating an exemplary configuration of a print job according to a second embodiment of the present invention.

In the second embodiment, the image forming system 100 executes a print job JB that creates a sheet bundle combining the ordinary sheet P1, the thick sheet P2, and a coated sheet P3. FIG. 13 illustrates an exemplary configuration of the print job JB. As illustrated in FIG. 13, the print job JB is executed to create, for example, 2000 copies of the sheet bundle combining the thick sheet P2 as a first page, the coated sheet P3 as a second page, and the ordinary sheet P1 as a third page. Herein, machine productivities for the sheets are defined such that 100 ppm for the ordinary sheet P1, 50 ppm for the thick sheet P2, and 100 ppm for the coated sheet P3. In a case where a sheet type is switched to another sheet type during printing, one second is required for fixing temperature switching time, compared with the case where sheets of a same type are printed consecutively.

In the image forming system 100 illustrated in FIG. 1, the sheet supply unit 220 is configured to have second stages, namely, the first sheet supply tray 222 and the second sheet supply tray 224. Accordingly, in a case where the print job JB that combines three sheet types is executed as illustrated in FIG. 13, the number of sheet supply tray would be insufficient. To cope with this, it is necessary, for example, to change sheet type setting and to refill sheets onto the sheet supply unit 220 after a preceding job of divided print jobs is finished.

[Examples of Print Pattern Types]

FIGS. 14 and 15 illustrate examples of print pattern types of the print job JB illustrated in FIG. 13. Herein, the print job JB has a total of two types of print patterns D and E as combinations of print patterns. The time needed to output each of the print patterns D and E is determined based on the sheet intervals of the ordinary sheet P1, the thick sheet P2, and the coated sheet P3, and on the time needed to switch the fixing temperatures.

As illustrated in FIG. 14, the print pattern D includes two divided jobs, namely, a job JB1 (a first job) and a job JB2 (a second job). The job JB1 prints images on 2000 thick sheets P2. The job JB2 prints images on the coated sheets P3 and the ordinary sheets P1 (4000 in total), and then, combines the thick sheets P2. In the job JB1, the thick sheets P2 are placed on the first sheet supply tray 222, and the ordinary sheets P1 are placed on the second sheet supply tray 224. In the job JB2, the coated sheets P3 are placed on the first sheet supply tray 222, and the ordinary sheets P1 are placed on the second sheet supply tray 224.

The time needed to output the job JB1 would be 40 minutes that corresponds to the time needed to print images on the thick sheets P2. The time needed to output the job JB2 would be a total of 126 minutes, which is a sum of 20 minutes needed to print images on the coated sheets P3, 20 minutes needed to print images on the ordinary sheets P1, 66 minutes that is the time needed to switch the fixing temperatures for 4000 times, and 20 minutes needed to combine the thick sheets P2. Accordingly, the total time needed to output the print pattern D would be 166 minutes.

As illustrated in FIG. 15, the print pattern E includes two divided jobs, namely, a job JB1 (a first job) and a job JB2 (a second job). The job JB1 prints images on 2000 ordinary sheets P1 and on 2000 coated sheets P3. The job JB2 prints images on the 2000 thick sheets P2 and then, combines the coated sheets P3/the ordinary sheets P1 (4000 sheets in total) into the thick sheets P2. In the job JB1, the coated sheets P3 are placed on the first sheet supply tray 222, and the ordinary sheets P1 are placed on the second sheet supply tray 224. In the job JB2, the thick sheets P2 are placed on the first sheet supply tray 222, and the ordinary sheets P1 are placed on the second sheet supply tray 224.

The time needed to output the job JB1 would be a total of 106 minutes, which is a sum of 20 minutes needed to print images on the coated sheets P3, 20 minutes needed to print images on the ordinary sheets P1, and 66 minutes that is the time needed to switch the fixing temperatures for 4000 times. The time needed to output the job JB2 would be a total of 120 minutes, which is a sum of 40 minutes needed to print images on the thick sheets P2 and 80 minutes needed to combine the coated sheets P3/ordinary sheets P1 into the thick sheets P2. Accordingly, total time needed to output the print pattern E would be 226 minutes.

[Exemplary Display of Screen]

Figure 16:
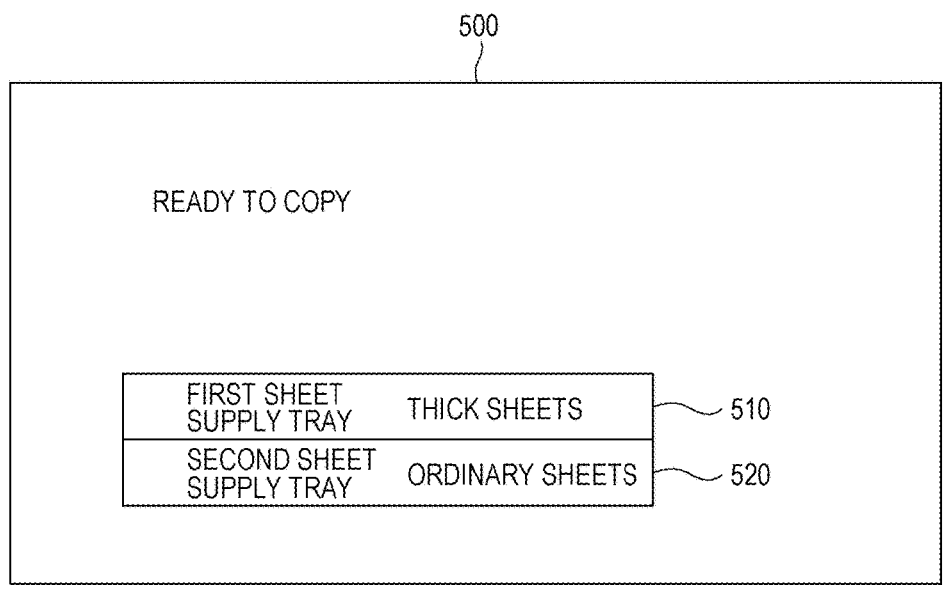
FIG. 16 is a diagram illustrating an exemplary display of a print-start standby screen.

FIG. 16 is an exemplary display of a print-start standby screen 500 to displayed on the operation display unit (notification unit) 240 before the print job JB is started. The print-start standby screen 500 displays characters of "Ready to Copy", an image 510 in which the characters of "first sheet supply tray" representing the first sheet supply tray 222 and the type of sheets placed in the first sheet supply tray 222 are associated with each other, and an image 520 in which the characters of "second sheet supply tray" representing the second sheet supply tray 224 and the type of sheets placed in the second sheet supply tray 224 are associated with each other. In the present example, characters of "thick sheet" are displayed on the image 510, and characters of "ordinary sheet" are displayed on the image 520.

Figure 17:
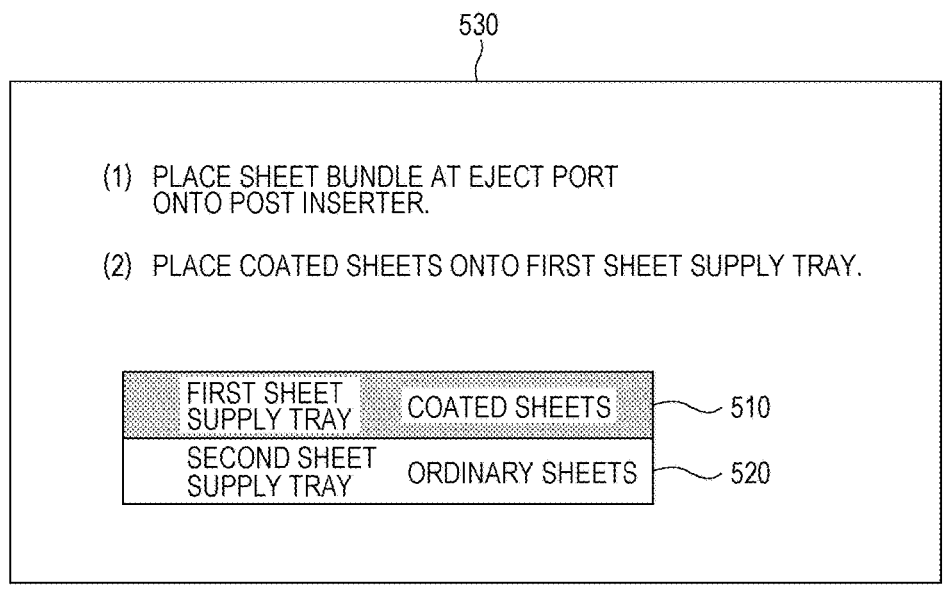
FIG. 17 is a diagram illustrating an exemplary display of a sheet refill alarm screen.

FIG. 17 is an exemplary display of a sheet refill alarm screen 530 displayed on the operation display unit 240 after the job JB1 is finished. When printing of the job JB1 is finished, the print-start standby screen 500 is switched to the sheet refill alarm screen 530. On the sheet refill alarm screen 530, the characters "(1) Place sheet bundle at eject port onto post inserter. (2) Place coated sheets onto first sheet supply tray." and the above-described corresponding images 510 and 520 are displayed. On the image 510, in order to prompt the user to refill (for replacement) the coated sheets P3 onto the first sheet supply tray 222, a display portion for the sheet type switches from "thick sheet" to "coated sheet". At this time, it is also possible to highlight the image 510 or allow the image 510 to blink so as to be easily recognized by the user.

[Exemplary Operation of Image Forming System 100]

Figure 18:
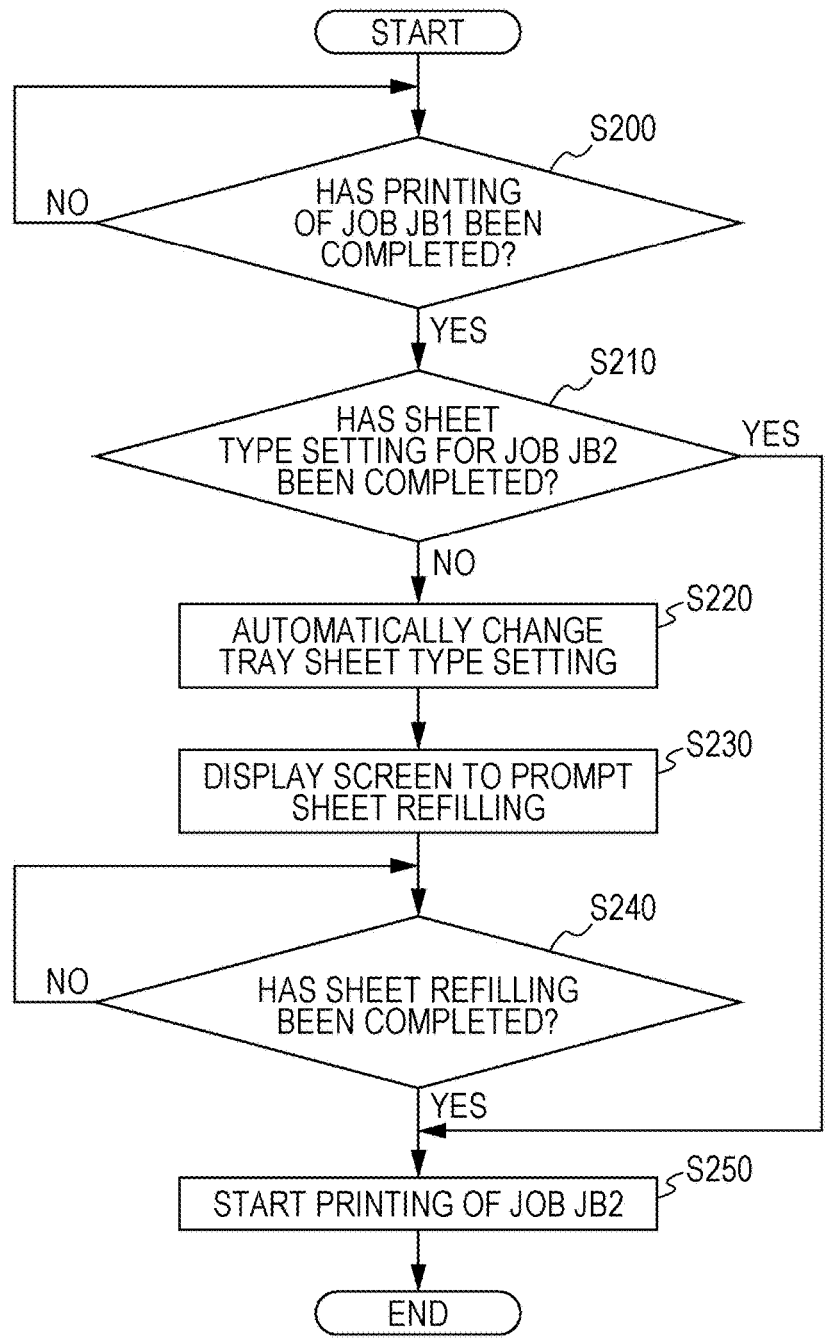
FIG. 18 is a flowchart illustrating exemplary operation of the image forming system.

FIG. 18 illustrates exemplary operation of the image forming system 100 in a case where sheet type change and sheet refilling are needed in execution of the print job JB. The control unit 50 reads a program from a memory such as the ROM 54 and executes it, thereby executing an operation sequence illustrated in the flowchart in FIG. 18. In the present example, execution of the print pattern D illustrated in FIG. 14 will be described.

In step S200, as illustrated in FIG. 18, the control unit 50 determines whether printing of the job JB1 has been finished. In a case where the control unit 50 determines that printing of the job JB1 has not been finished, continues monitoring whether printing of the job JB1 is finished. In contrast, when the control unit 50 determines that the printing of the job JB1 has been finished, the processing moves on to step S210. Whether the job JB1 has been finished may be determined, for example, based on a result of sheet counting by a sensor, or based on the printing time of the job JB1.

In step S210, the control unit 50 determines whether sheet type setting for the sheet to be used in the job JB2 has been finished. When the control unit 50 determines that the sheet type setting for the sheet to be used in the job JB2 has been finished, the processing moves on to step S250. This corresponds to a case, for example, where the sheet supply unit 220 of the image forming apparatus 200 is configured to have three-stage sheet supply trays, the number of sheet types to be used in the print job JB is three or less, and sheet type setting has already been executed for each of the sheet supply trays.

In contrast, when the control unit 50 determines in step S210 that the sheet type setting for the job JB2 has not been finished, the processing moves on to step S220. This corresponds to a case, for example, as illustrated in FIG. 1, where the sheet supply unit 220 of the image forming apparatus 200 is configured to have two-stage sheet supply trays, the number of sheet types to be used in the print job JB is three or more, and sheet type setting for the job JB2 has to be executed after the job JB1 is finished.

In step S220, the control unit 50, based on information on the sheet type to be used for the job JB2, automatically changes the sheet type setting for the sheet supply unit 220. When printing of the thick sheets P2 in the job JB1 is finished, for example, the control unit 50 automatically changes the sheet type setting for the first sheet supply tray 222 from the thick sheet P2 to the coated sheet P3.

In step S230, the control unit 50 switches the print-start standby screen 500, displayed on the operation display unit 240, to the sheet refill alarm screen 530. As illustrated in FIG. 17, for example, by allowing a message to prompt placing the coated sheets P3 onto the first sheet supply tray 222 to be displayed on the operation display unit 240, the control unit 50 alerts the user that sheet refilling is required.

In step S240, the control unit 50 determines whether sheet refilling onto the sheet supply unit 220 has been finished. Specifically, the control unit 50 determines, for example, that sheet refilling onto the sheet supply unit 220 is finished, by a fact that, after the coated sheets P3 have been placed onto the first sheet supply tray 222, setting of information on placed sheets, or operation of the print start button for the job JB2 is executed on the operation display unit 240, or the like. When the control unit 50 determines that sheet refilling onto the sheet supply unit 220 has not been finished, continues to check until sheet refilling onto the sheet supply unit 220 is finished.

In contrast, when the control unit 50 determines that the sheet refilling onto the sheet supply unit 220 has been finished, the processing moves on to step S250. In step S250, the control unit 50 starts printing the job JB2.

In the second embodiment, as described above, the control unit 50 automatically executes sheet type change in a case where sheet type change or sheet refilling onto the sheet supply unit 220 are required during printing the job JB. This configuration can reduce time and processes required for the user. Moreover, the sheet refill alarm screen 530 is displayed in a time zone in which the user is available for operation including sheet refilling onto the sheet supply tray 310 of the post inserter 300. With this configuration, it is possible to reliably refill the sheets onto the sheet supply unit 220. Accordingly, it is possible to prevent occurrence of downtime for a standby period of awaiting until sheet refilling onto the sheet supply unit 220 is finished.

<Third Embodiment>

In a third embodiment, in a case where a sheet shortage state during execution of a print job JB is predicted, an alarm screen is configured to be displayed to alert a user to refill the sheets. Note that the other configuration and operation of the image forming system 100 are similar to the case in the above-described first embodiment. Therefore, for components used in common, same reference signs are attached and detailed description will be omitted.

[Exemplary Configuration of Image Forming System 100]

As illustrated in FIG. 7, the image forming apparatus 200, which is a component of the image forming system 100, includes the sheet supply unit 220. The sheet supply unit 220 includes a sheet remaining amount detection unit 228 (broken line). The sheet remaining amount detection unit 228 is provided inside each of the first sheet supply tray 222 and the second sheet supply tray 224, and detects the amount of sheets remaining in each of the first sheet supply tray 222 and the second sheet supply tray 224. The sheet remaining amount detection unit 228 is equipped with, for example, an optical sensor including a light-emitting portion and a light-receiving portion, and calculates a sheet remaining amount by calculating a distance to the sheet based on a light beam reflected on the sheet. Alternatively, the sheet remaining amount detection unit 228 maybe equipped with a weight detection sensor that detects the sheet remaining amount from the weight of the sheets placed on the first sheet supply tray 222 and the second sheet supply tray 224, or may be equipped with a sheet loading weight amount detection sensor arranged in a direction of loading of the sheets. It is also possible to employ other known techniques for this purpose.

[Exemplary Configuration of Print Job]

Figure 19:
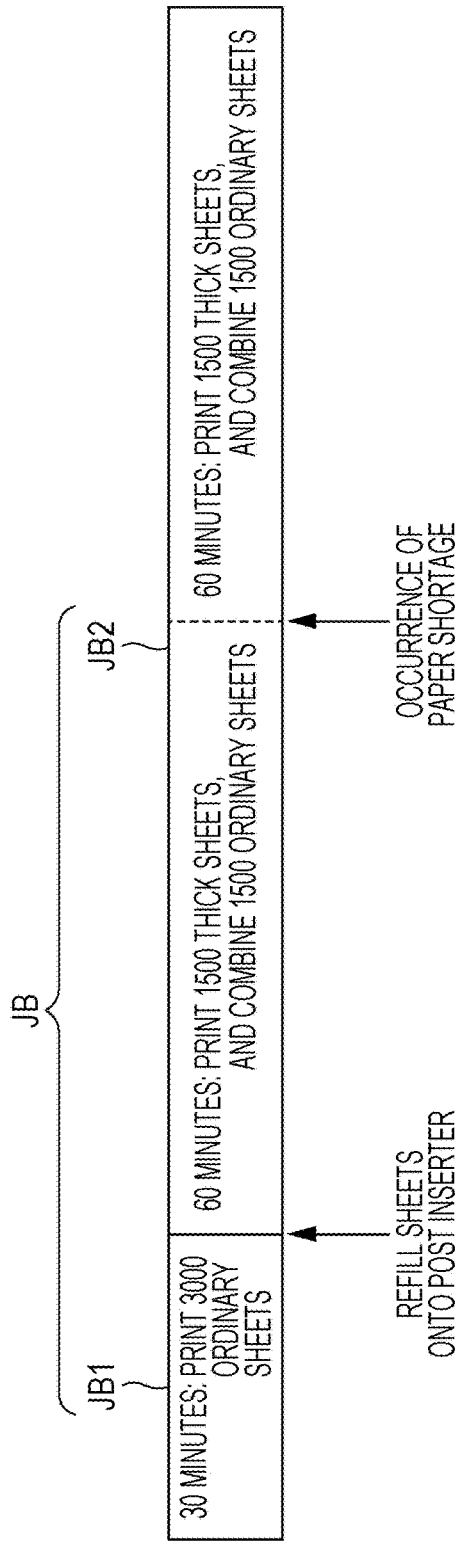
FIG. 19 is a diagram illustrating an exemplary configuration of a print job according to a third embodiment of the present invention.

FIG. 19 illustrates an exemplary configuration of a print job JB of the print pattern B executed in the third embodiment. In the present example, as the sheet remaining amount for the sheet supply unit 220, it is assumed that 4500 ordinary sheets P1 are placed onto the first sheet supply tray 222, and 1500 thick sheets P2 are placed onto the second sheet supply tray 224, meaning the maximum possible number of sheets are placed onto the trays.

When printing of a job JB1 is finished in the print job JB, a sheet bundle of the printed ordinary sheet P1 is refilled onto the sheet supply tray 310 of the post inserter 300, thereafter, printing of a job JB2 is started. The job JB2 is configured to print images on 3000 thick sheets P2, although the number of thick sheets P2 placed on the second sheet supply tray 224 is only 1500. Accordingly, a sheet shortage error occurs at a point when printing of the 1500 thick sheets P2 has been finished.

To cope with this, in the present example, in a timing that is after printing of the job JB1 is finished and before printing of the job JB2 is started, namely, in a timing that when the user refills the ordinary sheets P1 onto the sheet supply tray 310 of the post inserter 300, a sheet refill alarm screen to prompt refilling the thick sheets P2 onto the first sheet supply tray 222 is displayed on the operation display unit (notification unit) 240. With this display, the user is alerted to refill the sheets.

[Exemplary Display of Screen]

Figure 20:
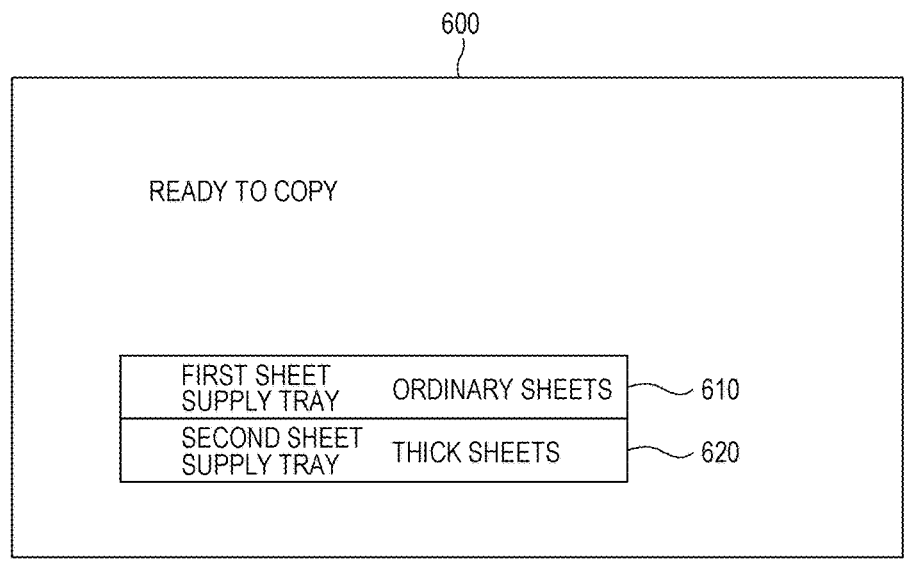
FIG. 20 is a diagram illustrating an exemplary display of the print-start standby screen.

FIG. 20 is an exemplary display of a print-start standby screen 600 to be displayed on the operation display unit 240 before the print job JB is started. The print-start standby screen 600 displays characters of "Ready to Copy", an image 610 in which characters of "first sheet supply tray" representing the first sheet supply tray 222 and the type of sheets placed in the first sheet supply tray 222 are associated with each other, and an image 620 in which characters of "second sheet supply tray" representing the second sheet supply tray 224 and the type of sheets placed in the second sheet supply tray 224 are associated with each other. In the present example, characters of "thick sheet" are displayed on the image 610, and characters of "ordinary sheet" are displayed on the image 620.

Figure 21:
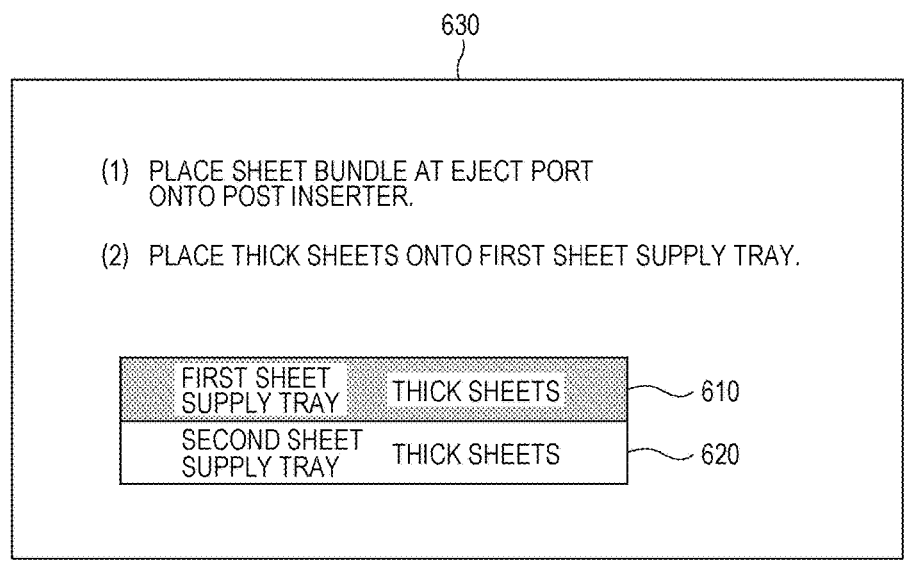
FIG. 21 is a diagram illustrating an exemplary display of the sheet refill alarm screen.

FIG. 21 is an exemplary display of a sheet refill alarm screen 630 to be displayed on the operation display unit 240 after the job JB1 is finished. When printing of the job JB1 is finished, the print-start standby screen 600 is switched to the sheet refill alarm screen 630. On the sheet refill alarm screen 630, characters of " (1) Place sheet bundle at eject port onto post inserter. (2) Place thick sheets onto first sheet supply tray." and the above-described corresponding images 610 and 620 are displayed. On the image 610, in order to prompt the user to refill the thick sheets P2 onto the first sheet supply tray 222, a display portion for the sheet type is switched from "ordinary sheet" to "thick sheet". At this time, it is also possible to highlight the image 610 or allow the image 610 to blink so as to be easily recognized by the user.

[Exemplary Operation of Image Forming System 100]

Figure 22:
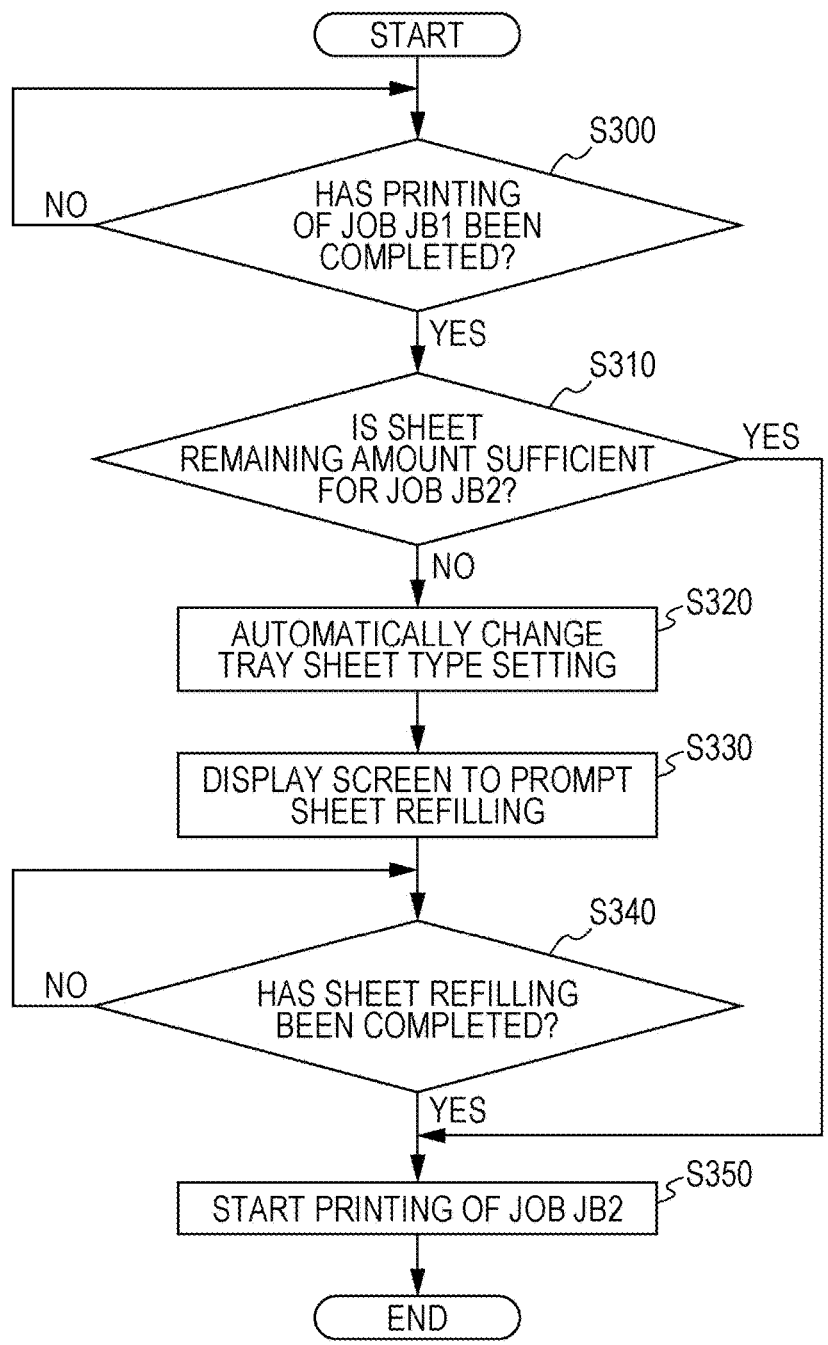
FIG. 22 is a flowchart illustrating exemplary operation of the image forming system.

FIG. 22 illustrates an exemplary operation of the image forming system 100 in a case where sheet shortage occurs. The control unit 50 reads a program from a memory such as the ROM 54 and executes it, thereby executing an operation sequence illustrated in the flowchart in FIG. 22. In the present example, execution of the print job JB of the print pattern B illustrated in FIG. 5 will be described.

In step S300, as illustrated in FIG. 22, the control unit 50 determines whether printing of the ordinary sheets P1 to be inserted in the job JB1 has been finished. In a case where the control unit 50 determines that printing of the job JB1 has not been finished, continues determination of whether printing of the job JB1 is finished. In contrast, when the control unit 50 determines that the printing of the job JB1 has been finished, the processing moves on to step S310.

In step S310, the control unit 50 determines, before executing the job JB2, whether the remaining amount of the thick sheets P2 placed on the second sheet supply tray 224 to be used in the job JB2 is the number of sheets to be printed in the job JB2 or more, based on the result of output from the sheet remaining amount detection unit 228. When the control unit 50 determines that the remaining amount of the thick sheets P2 placed on the second sheet supply tray 224 is the number of sheets to be printed in the job JB2 or more, processing moves on to step S350. This corresponds to a case, for example, where the number of sheets to be printed in the job JB2 is 3000, and the number of thick sheets P2 placed on the second sheet supply tray 224 is 3000 or more. In step S350, the control unit 50 determines that there is no possibility of occurrence of shortage of the thick sheets P2 during printing of the job JB2 and starts printing of the job JB2.

In contrast, when the control unit 50 determines in step S310 that the remaining amount of the thick sheets P2 placed on the second sheet supply tray 224 is less than the number of sheets to be printed in the job JB2, processing moves on to step S320. This corresponds to a case, for example, where the number of sheets to be printed in the job JB2 is 3000, and the number of thick sheets P2 placed in the second sheet supply tray 224 is 1500. In this case, if the job JB2 is executed, shortage of the thick sheet P2 would occur.

In step S320, the control unit 50 automatically changes the sheet type setting of the first sheet supply tray 222. The control unit 50 automatically changes the sheet type setting of the first sheet supply tray 222, for example, from the ordinary sheet P1 to the thick sheet P2. In the present example, the sheet type change for the first sheet supply tray 222 is executed regardless of whether the thick sheets P2 have been refilled onto the first sheet supply tray 222.

In step S330, the control unit 50 switches the print-start standby screen 600, displayed on the operation display unit 240, to the sheet refill alarm screen 630. As illustrated in FIG. 21, for example, by displaying a message to prompt placing the thick sheets P2 onto the first sheet supply tray 222 on the operation display unit 240, the control unit 50 alerts the user that sheet refilling is required.

In step S340, the control unit 50 determines whether refilling of the thick sheets P2 by the user onto the first sheet supply tray 222 has been finished. When the control unit 50 determines that refilling of the thick sheets P2 by the user onto the first sheet supply tray 222 has not been finished, continues to check whether sheet refilling by the user is finished. In contrast, when the control unit 50 determines that refilling of the thick sheets P2 by the user onto the first sheet supply tray 222 has been finished, the processing moves on to step S350. In step S350, the control unit 50 determines that there is no possibility of occurrence of shortage of the thick sheets P2 during printing of the job JB2 and starts printing of the job JB2.

According to the third embodiment, as described above, the sheet refill alarm screen 630 is displayed to prompt the user to refill sheets, specifically, to refill the thick sheets P2 onto the first sheet supply tray 222 in a user operation timing of placing the ordinary sheets P1 onto the sheet supply tray 310 of the post inserter 300. With this configuration, even when occurrence of sheet shortage during a user operation unavailable time zone is predicted, it is possible to execute sheet refill operation in advance during the user operation available time zone. Accordingly, occurrence of downtime in the image forming system 100 can be prevented.

<Fourth Embodiment>

In a fourth embodiment, in a case where user availability is suddenly cancelled in a time zone where the user is scheduled to be available, the print pattern is configured to be switched to an optimum print pattern. Note that the other configuration and operation of the image forming system 100 are similar to the above-described first embodiment. Therefore, for components used in common, same reference signs are attached and detailed description will be omitted.

Figure 23:
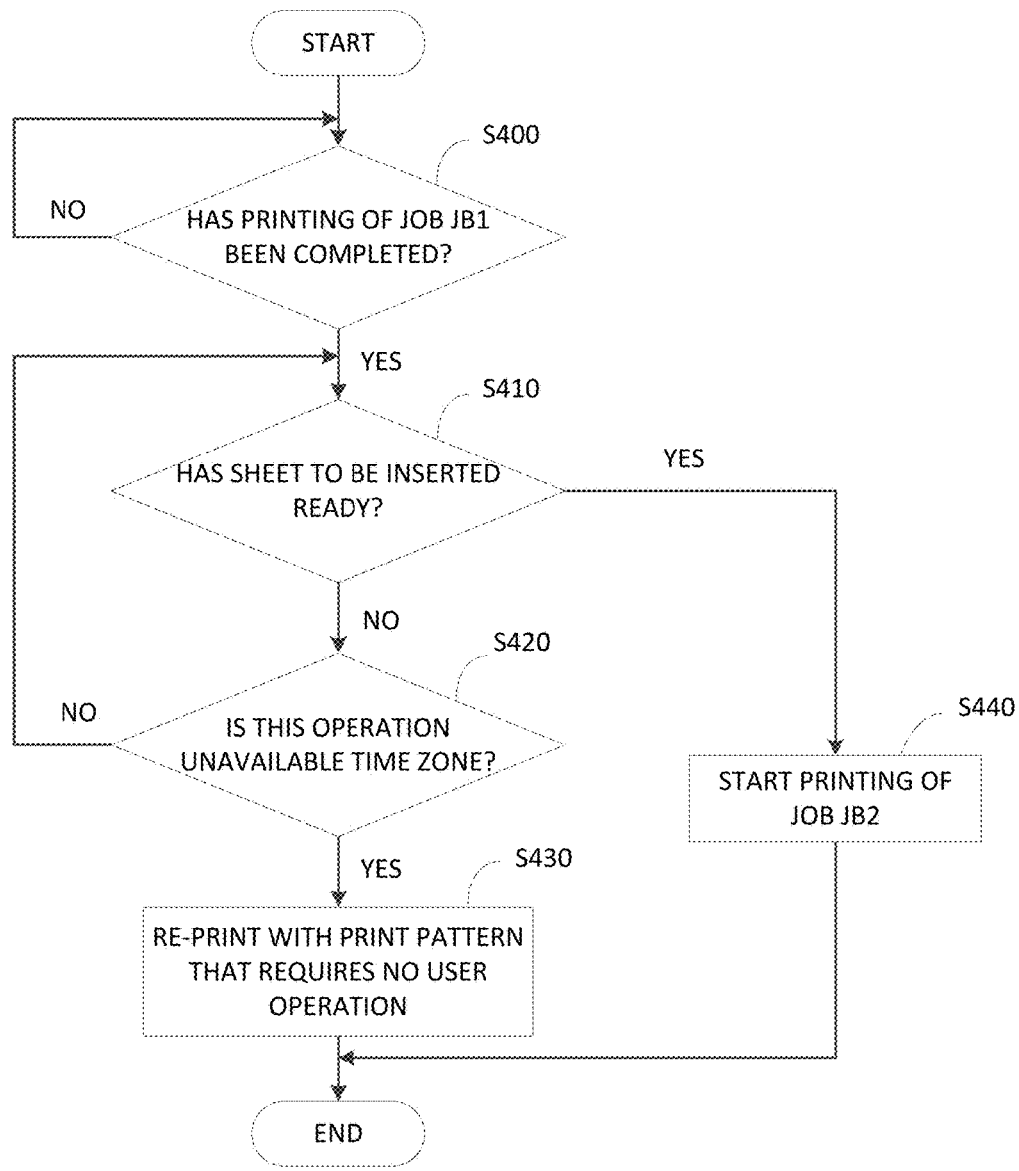
FIG. 23 is a diagram illustrating exemplary operation of an image forming system according to a fourth embodiment of the present invention.

FIG. 23 is a flowchart illustrating an exemplary operation of the image forming system 100 in a case where user availability is suddenly cancelled. The control unit 50 reads a program from a memory such as the ROM 54 and executes it, thereby executing an operation sequence illustrated in the flowchart in FIG. 23. In the present example, the print job JB of the print pattern B illustrated in FIG. 5 is assumed to be executed at 14:00.

In step S400, as illustrated in FIG. 23, the control unit 50 determines whether printing of the job JB1 of the print pattern B has been finished. In a case where the control unit 50 determines that printing of the job JB1 has not been finished, continues to check whether printing of the job JB1 is finished. In contrast, when the control unit 50 determines that the printing of the job JB1 has been finished, the processing moves on to step S410.

In step S410, the control unit 50 determines, within a predetermined time period after completion of printing the job JB1, whether refilling of the ordinary sheets P1 onto the sheet supply tray 310 of the post inserter 300 has been finished. Specifically, in a case where the assumed print finish time of the job JB1 is 14:30, the control unit 50 determines, for example, at 15:00, which is 30 minutes past 14:30, whether refilling of the ordinary sheets P1 onto the sheet supply tray 310 of the post inserter 300 has been finished. When the control unit 50 determines that refilling of the ordinary sheets P1 onto the sheet supply tray 310 of the post inserter 300 has been finished, the processing moves on to step S440. In step S440, the control unit 50 starts printing the job JB2.

In contrast, when the control unit 50 determines in step S410 that refilling of the ordinary sheets P1 onto the sheet supply tray 310 of the post inserter 300 has not been finished, the processing moves on to step S420. This corresponds to a case, for example, where user availability is suddenly cancelled for a time zone where the user is scheduled to be available, and it is not possible to execute operation of refilling the ordinary sheets P1 onto the sheet supply tray 310 of the post inserter 300.

In step S420, the control unit 50 determines whether the current time zone corresponds to the user operation unavailable time zone. Specifically, in a case where the current time is 15:00, for example, the control unit 50 determines whether the button 248, which indicates that the user is unavailable during 15:00 to 16:00, is selected on the user availability setting screen 242 illustrated in FIG. 9.

In a case, where the control unit 50 determines that the current time zone does not correspond to the user operation unavailable time zone, namely, that the button 248 is not selected, processing returns to step S410. The control unit 50 continues to check whether the ordinary sheets P1 are placed onto the sheet supply tray 310 of the post inserter 300. This procedure is provided because the current time zone does not correspond to the user operation unavailable time zone, and thus, the user is available for operation. That is, it is possible that operation of refilling the ordinary sheet P1 onto the sheet supply tray 310 of the post inserter 300 is restarted.

In contrast, in a case where the control unit 50 determines in step S420 that the current time zone corresponds to the user operation unavailable time zone, namely, that the button 248 is selected, processing moves to step S430. In step S430, the control unit 50 selects a print pattern that does not require user operation, and executes re-printing with the selected print pattern. The time zone 15:00 to 16:00 has been set to the operation unavailable time zone, and thus, there is extremely low probability that refilling of the ordinary sheets P1 onto the sheet supply tray 310 of the post inserter 300 is executed during this period. The procedure of re-printing is provided to cope with a possibility that printing operation stops during this period. For example, the control unit 50 selects the print pattern C illustrated in FIG. 6 as the print pattern that does not require user operation, and then, executes re-printing with the selected print pattern C.

According to the fourth embodiment, as described above, even in a case where user availability is cancelled for a time zone where the user is scheduled to be available, it is possible to select an optimum print pattern based on information on the user operation unavailable time zone. With this configuration, it is possible to reduce print stop time of the image forming system 100 and prevent occurrence of downtime.

Note that the technical scope of the present invention is not limited to the above-described embodiments but includes various modifications of each of the above-described embodiments without departing from the scope and spirits of the present invention. On the user availability setting screen 242 in the above-described embodiments, the user operation unavailable time zone is selected. Alternatively, it is possible to configure such that the user operation available time zone is selected. In this case, the control unit 50 obtains information on the operation available time zone based on selection on the user availability setting screen 242, and selects an optimum print pattern based on the obtained information on the operation available time zone.

Moreover, in the above-described embodiments, the user availability setting screen 242, the sheet refill alarm screen 530, or the like, is configured to be displayed on the operation display unit 240. However, the configuration is not limited to this. For example, it is possible to configure such that the computer 400 is incorporated in the image forming system 100, and that the user availability setting screen 242, the sheet refill alarm screen 530, or the like, is displayed on a display unit of the computer 400 so as to allow the user operation available/unavailable time zone to be selected on the display unit.

Moreover, in the above-described embodiment, an alert of sheet refilling, or the like, is issued on the operation display unit 240, but the configuration for alerting is not limited to this. Alternatively, it is possible to configure, for example, such that the alert to refill the sheets are issued to the user by using a sound output unit (notification unit).

In the system configuration in the above-described embodiment, the post inserter 300 is connected to the image forming apparatus 200, but the configuration is not limited to this. For example, it is possible to provide the post inserter (insertion unit) 300 inside the image forming apparatus 200 and to execute embodiments of the present invention by the image forming apparatus 200 as a single unit. In this case, the post inserter 300 is arranged downstream of the image forming unit 210 in the sheet conveyance direction D1.

Although the present invention has been described and illustrated in detail, it is clearly understood that the same is by way of illustrated and example only and is not to be taken byway of limitation, the scope of the present invention being interpreted by terms of the appended claims.

What is claimed is:

1. An image forming system capable of executing a print job including a first job and a second job, the image forming system comprising:
    an image forming apparatus configured to print an image on a sheet based on the first job, and thereafter, print an image on a sheet based on the second job, wherein a sheet type of the first job is different from a sheet type of the second job;
    a sheet conveyance apparatus configured to combine the sheet based on the first job with the sheet based on the second job;
    an input unit configured to be used to input a time period in which execution of user operation related to the sheet conveyance apparatus is possible; and
    a control unit configured to select a print pattern having the first job scheduled to be completed within the time period that has been input by the input unit and to print the job so as to finish the first job within the time period that has been input by the input unit.

2. The image forming system according to claim 1, comprising a plurality of sheet supply trays configured to house sheets,
    wherein, in a case the number of sheet types to be used in the job exceeds the number of sheet supply trays, the control unit causes a notification unit, during the user operation, to alert to refill the sheets of the type that differs from the type of sheets being placed on the sheet supply tray.

3. The image forming system according to claim 1, comprising:
    a sheet supply tray configured to house sheets; and
    a detection unit configured to detect a remaining amount of sheets housed in the sheet supply tray, wherein, when the control unit determines, based on a detection result obtained by the detection unit, that the number of sheets housed in the sheet supply tray in the second job is insufficient, the control unit causes the notification unit, during the user operation time, to alert to refill the sheets onto the sheet supply tray.

4. The image forming system according to claim 1, wherein, in a case the user operation has not been finished within the time period, the control unit selects a print pattern in which the user operation is not required.

5. An image forming apparatus capable of executing a print job including a first job and a second job, the image forming apparatus comprising:
   an image forming unit configured to print an image on a sheet based on the first job, and thereafter, print an image on a sheet based on the second job, wherein a sheet type of the first job is different from a sheet type of the second job;
   an insertion unit configured to combine the sheet based on the first job with the sheet based on the second job;
   an input unit configured to be used to input a time period in which execution of user operation related to the insertion unit is possible; and
   a control unit configured to select a print pattern having the first job scheduled to be completed within the time period that has been input by the input unit and to execute printing of the job so as to finish the first job within the time period that has been input by the input unit.

6. The image forming apparatus according to claim 5, comprising a plurality of sheet supply trays configured to house sheets,
   wherein, in a case the number of sheet types to be used in the job exceeds the number of sheet supply trays, the control unit causes a notification unit, during the user operation, to alert to refill the sheets of the type that differs from the type of sheets being placed on the sheet supply tray.

7. The image forming apparatus according to claim 5, comprising:
   a sheet supply tray configured to house sheets; and
   a detection unit configured to detect a remaining amount of sheets housed in the sheet supply tray,
   wherein, when the control unit determines, based on a detection result obtained by the detection unit, that the number of sheets housed in the sheet supply tray in the second job is insufficient, the control unit causes the notification unit, during the user operation time, to alert to refill the sheets onto the sheet supply tray.

8. The image forming apparatus according to claim 5, wherein, in a case the user operation has not been finished within the time period, the control unit selects a print pattern in which the user operation is not required.

9. An image forming system capable of executing a print job including a first job and a second job, the image forming system comprising:
   an image forming apparatus configured to print an image on a sheet based on the first job, and thereafter, print an image on a sheet based on the second job;
   a sheet conveyance apparatus configured to combine the sheet based on the first job with the sheet based on the second job;
   an input unit configured to be used to input a time period in which execution of user operation related to the sheet conveyance apparatus is possible;
   a control unit configured to select a print pattern having the first job scheduled to be completed within the time period that has been input by the input unit and to print the job so as to finish the first job within the time period that has been input by the input unit; and
   a plurality of sheet supply trays configured to house sheets,
      wherein, in a case the number of sheet types to be used in the job exceeds the number of sheet supply trays, the control unit causes a notification unit, during the user operation, to alert to refill the sheets of the type that differs from the type of sheets being placed on the sheet supply tray.

10. An image forming system capable of executing a print job including a first job and a second job, the image forming system comprising:
   an image forming apparatus configured to print an image on a sheet based on the first job, and thereafter, print an image on a sheet based on the second job;
   a sheet conveyance apparatus configured to combine the sheet based on the first job with the sheet based on the second job;
   an input unit configured to be used to input a time period in which execution of user operation related to the sheet conveyance apparatus is possible; and
   a control unit configured to select a print pattern having the first job scheduled to be completed within the time period that has been input by the input unit and to print the job so as to finish the first job within the time period that has been input by the input unit
   wherein, in a case the user operation has not been finished within the time period, the control unit selects a print pattern in which the user operation is not required.

* * * * *